Mar. 27, 1923.

E. L. EDWARDS ET AL

1,450,025

SAFETY X-RAY APPARATUS

Filed Nov. 6, 1920

WITNESS:
R. F. Buckley.
R. H. Sample.

INVENTORS:
Edwin L. Edwards,
Frank A. Farwell,
By E. T. Silvius,
ATTORNEY.

Mar. 27, 1923.

E. L. EDWARDS ET AL

1,450,025

SAFETY X-RAY APPARATUS

Filed Nov. 6, 1920  6 sheets-sheet 2

WITNESS:
R. F. Buckley.
R. H. Sample.

INVENTORS:
Edwin L. Edwards,
Frank A. Farwell,
By E. J. Silvius,
ATTORNEY.

Mar. 27, 1923.

E. L. EDWARDS ET AL 1,450,025

SAFETY X-RAY APPARATUS

Filed Nov. 6, 1920

WITNESS:
R.F. Buckley.
R.H. Sample.

INVENTORS:
Edwin L. Edwards,
Frank A. Farwell,
By E.D. Silvius,
ATTORNEY.

Mar. 27, 1923.

E. L. EDWARDS ET AL 1,450,025

SAFETY X-RAY APPARATUS

Filed Nov. 6, 1920   6 sheets-sheet 4

WITNESS:
R. F. Buckley.
R. H. Sample.

INVENTORS:
Edwin L. Edwards,
Frank A. Farwell,
By E. F. Silvius,
ATTORNEY.

Mar. 27, 1923.

E. L. EDWARDS ET AL

SAFETY X-RAY APPARATUS

Filed Nov. 6, 1920

WITNESS:
R. F. Buckley.
R. H. Sample.

INVENTORS:
Edwin L. Edwards,
Frank A. Farwell,
By E. D. Silvius,
ATTORNEY.

Mar. 27, 1923.  
E. L. EDWARDS ET AL  
1,450,025  
SAFETY X-RAY APPARATUS  
Filed Nov. 6, 1920   6 sheets-sheet 6

WITNESS:  
R. F. Buckley.  
R. H. Sample.

INVENTORS:  
Edwin L. Edwards,  
Frank A. Farwell,  
By E. D. Silvius.  
ATTORNEY.

Patented Mar. 27, 1923.

1,450,025

UNITED STATES PATENT OFFICE.

EDWIN L. EDWARDS AND FRANK A. FARWELL, OF INDIANAPOLIS, INDIANA, ASSIGNORS TO EDWARDS X-RAY CORPORATION, OF INDIANAPOLIS, INDIANA, A CORPORATION OF INDIANA.

SAFETY X-RAY APPARATUS.

Application filed November 6, 1920. Serial No. 422,145.

*To all whom it may concern:*

Be it known that we, EDWIN L. EDWARDS and FRANK A. FARWELL, citizens of the United States, residing at Indianapolis, in the county of Marion and State of Indiana, have invented a new and useful Safety X-Ray Apparatus, of which the following is a specification, reference being had to the accompanying drawings, and to the letters and figures of reference marked thereon.

This invention relates to an apparatus having an electrical circuit for conducting a current of very high voltage, such as an X-ray machine, the invention having reference more particularly to means whereby to adjustably support an X-ray tube, and to guard the high-tension electrical circuit required in the use thereof so as to permit the use of the apparatus safely in an operating room, where the operator or others might accidentally or carelessly have contact with the circuit or elements of the apparatus charged with high-tension current, with serious results.

An object of the invention is to provide a safety X-ray apparatus which shall be so constructed as to be adapted to inclose or guard a high-tension transformer and also a high-tension electrical circuit and the portion of an X-ray tube with which the circuit is connected, and to adjustably support the X-ray tube, in order to prevent an operator or other person from unintentionally receiving a shock by the dangerously high voltage required by the X-ray apparatus.

Another object is to provide an X-ray apparatus with a cabinet stand which shall be adapted to adjustably support an X-ray tube and also support a high-tension transformer so that the high-tension circuit required shall be inclosed and isolated by space and securely guarded, to prevent accidental or inadvertent contact of a person with the circuit.

A further object is to provide an improved X-ray apparatus which shall be so constructed as to safely inclose all the elements of the apparatus which might become charged with high voltage electrical current, and adjustably support an X-ray tube conveniently to a person in seated position, and permit the X-ray tube to be used at different angles.

A still further object is to provide a simple and substantial X-ray apparatus having a supporting casing for the required X-ray tube and various electrical devices, the casing being required to adjustably support the X-ray tube and inclose the required high-tension circuit in such manner that various instruments associated with the X-ray tube shall not be liable to become charged by high voltage current, but may be sufficiently inclosed within the casing to safeguard against accidents, which inclosing casing shall be designed to be variously modified as to details of construction, and be durable and economical in use.

With the above-mentioned and other objects in view, the invention consists in high-tension electrical apparatus having safeguards against injury to persons by high-tension currents by inclosing the apparatus and precluding the possibility of accidental contact therewith, and without requiring expensive and troublesome electrically insulating material, and the invention consists also further in novel means for adjustably supporting an X-ray tube and inclosing a high-tension electrical circuit associated therewith, and in the parts and combinations and arrangements of parts or elements as hereinafter particularly described and further defined in the accompanying claims.

Referring to the drawings.

Similar reference characters in the various figures of the drawings indicate corresponding elements or features of construction or equivalents thereof hereinafter referred to or particularly described in detail.

In a practical embodiment of the invention a supporting casing or stand is provided which is adapted to not only safely inclose a high-tension transformer, but to adjustably support an X-ray tube of modern design in such manner that the necessary high-tension circuit and the rearward portion of the X-ray tube with which the circuit is connected shall be safely isolated by space from the wall of the casing, and also from various instruments commonly associated with an X-ray tube. The inclosing casing or stand may be variously constructed, a number of forms of structure being illustrated as sufficient to a full understanding of the invention. Each casing has a suitable bottom 1, and in accordance with the preferred form of construction the casing is rectangular in plan and has two side panels 2 and 3, a rear or back panel 4, and a top 5, all secured together and to the bottom, preferably by means of four corner posts 6, 7, 8, 9, such being substantially alike in the different modifications, excepting as hereinafter described, but the front portion especially of the casing may be variously constructed within the scope of the invention.

The X-ray tube preferably associated with the invention comprises a cylindrical stem 10 on the rear end of which is a radiator 11 and on the forward end of which is a bulb or head portion 12 having a forward neck 13 commonly composed of glass and lead combined. A high-tension electrical circuit or conductor 14 is suitably connected with the X-ray tube, usually at the end of the radiator. A step-up high-tension transformer 15 is suitably supported upon the bottom 1 and has a suitable frame 16 thereon supporting a reel 17 of well-known design with which the circuit 14, which is flexible, is connected, the circuit being suitably continued and connected with the transformer through the reel and the frame 16, as will be understood. Supply circuit wires 18 and 19 are connected with the transformer and extend through the wall of the casing, one of the circuit wires having a main supply line switch 20. Other circuit wires 21 and 22 are connected with the wires 18 and 19 respectively to supply current through low-tension circuit wires 23 and 24 suitably extending into the bulb 12 of the X-ray tube for a well-known purpose.

The various forms of structure of the casing may each support various electrical instruments as may be desired in association with the X-ray tube, such as an "auto" transformer 25, an X-ray switch 26 symbolically illustrated but which may be outside the casing, a filament switch 27, a solenoid controller 28, a filament controller 29, a filament transformer 30, a resistance coil 31, an automatic switch 32, and a milli-ammeter 33, the various instruments being well-known and are indicated as being incased.

According to the preferred form of construction as shown in Figs. 1 to 8, inclusive, the front of the inclosing casing has external vertical guides 34 and 35 and adjacent internal guides 36 and 37, and an adjustable panel 38 is vertically guided by the guides and has an aperture 39 therein. Two journal bearings 40 and 41 are secured to the inner side of the panel 38 to adjustably support the X-ray tube which has a suitable yoke or collar 42 secured thereto, preferably on the stem portion 10 thereof. Two shafts 43 and 44 are secured to the yoke or collar and are rotatably supported in the journal bearings, the shafts preferably extending through the side panels of the casing and having suitable handles on their ends whereby to turn the shafts, the side panels being suitably slotted to permit the shafts to be moved upward or downward. Thus supported the stem 10 extends through the aperture 39. A roller 45 is mounted in the upper forward portion and a similar roller 46 is mounted in the upper rearward portion of the casing, and rollers 47 and 48 are similarly arranged in the lower portion of the casing. Two belts 49 and 50 are secured to the upper portion of the panel 38 and extend over the upper rollers and downward adjacent to the back of the casing, and a counter-balancing weight 51 is secured to the belts. Two belts 52 and 53 are secured to the lower portion of the panel 38 and extend under the lower rollers and upward to the weight 51 to which they are secured. The upper portion of the front of the casing is closed by a flexible panel or blind 54 composed of slats secured to the belts 49 and 50 and arranged to be guided on a vertical plane with the panel 38, the flexible panel extending under the top 5 of the casing. Another flexible panel composed of slats 55 secured to the belts 52 and 53 extends from the panel 38 downward to and under the roller 47 to close the lower portion of the front of the casing. The aperture 39 permits the X-ray tube to be tilted, and to prevent over-curious persons from inserting a hand through the aperture 39 and becoming shocked by high-tension current; a guard plate 56 is arranged in the aperture and secured to the yoke 42. The X-ray tube is so arranged that the high-tension circuit 14 extends directly upward from the reel 17 to the rearward end of the stem 10 at a safe distance from all portions of the casing wall so as to be isolated by space from the wall, and obviate the necessity of providing the casing wall with electrically insulating lining.

Devices for completing a low-voltage circuit with the wires 23 and 24 may be variously constructed, a pair of brush-contact bars or rods 57 and 58 preferably being supported on the interior guides 36 and 37 respectively and having circuit wires 59 and 60 connected thereto respectively, the wires being suitably connected with the supply circuit. Electrical brushes 61 and 62 are suitably mounted on the inner side of the panel 38 in contact with the bars or rods 57 and 58 respectively and have circuit wires 63 and 64 connected therewith that suitably lead to the wires 24 and 23 respectively.

The front of the X-ray tube preferably is screened, and when the X-ray tube projects through the front of the casing as shown a cap-shaped filtering screen 65 composed of suitable material may be secured to the front of the panel 38 so as to cover the forward portion of the X-ray tube, the front of the screen preferably being semi-transparent or transparent to permit the neck 13 to be seen through the screen. The screen may be removed when desired. Incidentally it serves the useful purpose of excluding dust from the apparatus. When the inflexible panel 38 is raised or lowered to adjust the X-ray tube the flexible panels are moved in unison and always afford closure for the front of the casing.

Figure 1:
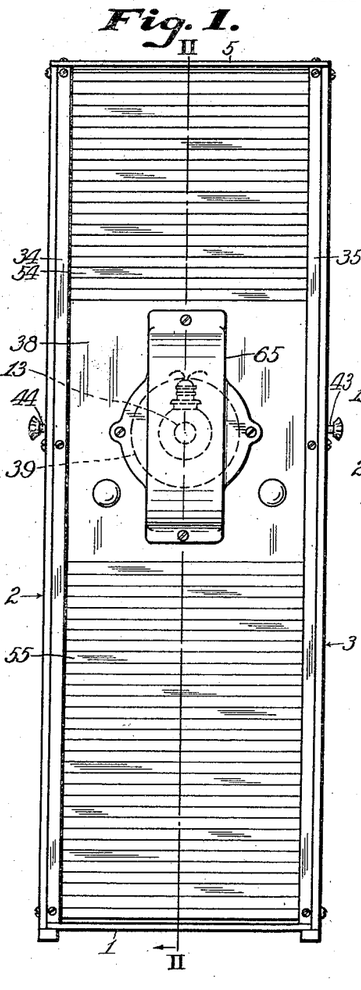
Figure 1 is a front elevation of the safety X-ray apparatus as preferably constructed.
Figure 2:
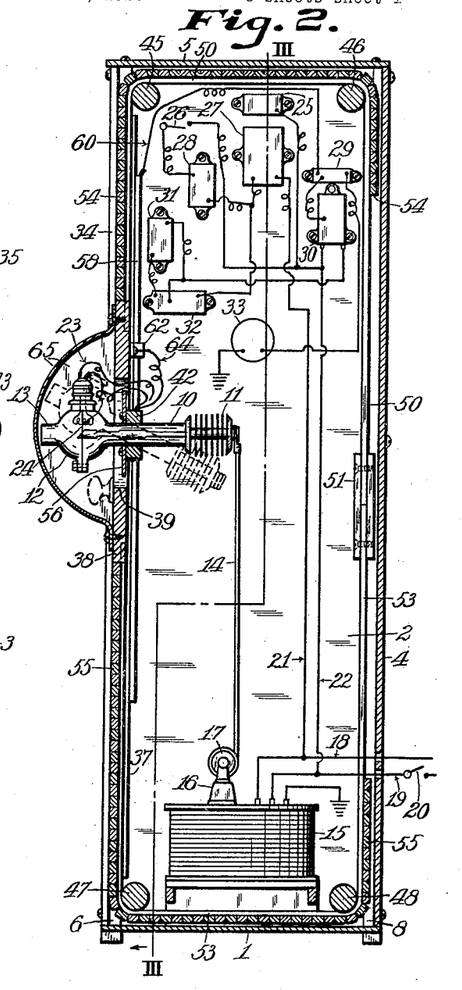
Fig. 2 is a vertical sectional elevation approximately on the line II—II on Fig. 1.
Figures 3, 4, 5, 6, 7, 8:
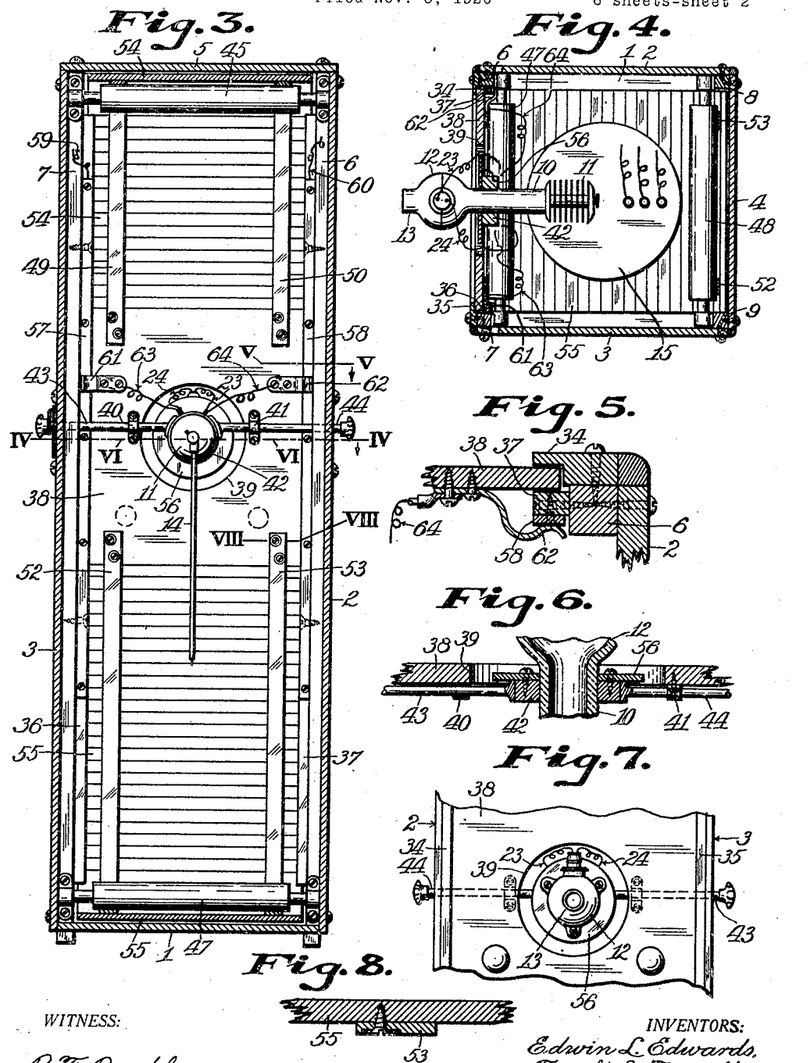
Fig. 3 is a sectional elevation approximately on the line III—III in Fig. 2.
Fig. 4 is a horizontal section approximately on the line IV—IV on Fig. 3.
Fig. 5 is a fragmentary section approximately on the line V—V in Fig. 3 on an enlarged scale.
Fig. 6 is a fragmentary sectional detail on the line VI—VI in Fig. 3 on an enlarged scale.
Fig. 7 is a fragmentary front view of the apparatus with a portion thereof omitted.
Fig. 8 is a fragmentary section on the line VIII—VIII in Fig. 3 on an enlarged scale.
Figure 9:
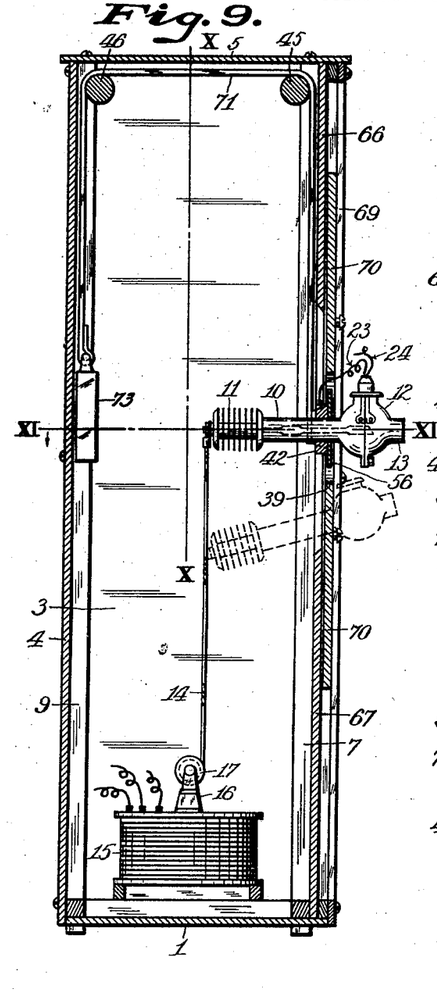
Fig. 9 is a vertical sectional elevation approximately central of the apparatus slightly modified as to the supporting casing.
Figure 10:
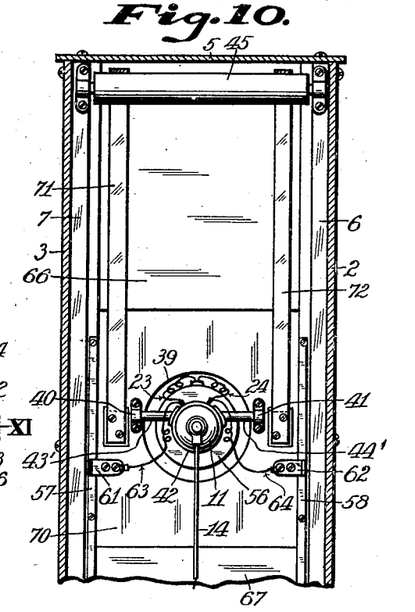
Fig. 10 is a fragmentary sectional elevation approximately on the line X—X in Fig. 9.
Figure 11:
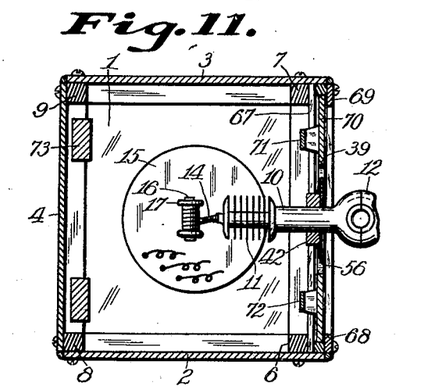
Fig. 11 is a horizontal section on the line XI—XI in Fig. 9.

Constructed as indicated in Figs. 9, 10 and 11, the front of the casing has a fixed panel 66 closing the upper portion and a fixed panel 67 closing the lower portion of the casing front, and forward of the panels two guides 68 and 69 are suitably supported and guide an adjustable panel 70 which has the aperture 39 therein. The upper portion of the casing has the guide rollers 45 and 46 therein, as above described, and belts 71 and 72 are suitably connected to the panel 70 and extend over the rollers, and the belts have counterbalancing weights 73 thereon. The inner side of the panel 70 is provided with the journal bearings 40 and 41 which rotatively support shafts 43' and 44' respectively that are secured to the yoke or collar 42 on the X-ray tube, the guard plate 56 being secured to the yoke or collar 42. The space between the panels 66 and 67 permits vertical movement of the X-ray tube with which the high-tension circuit 14 is connected. This modification permits the circuit to be made with the wires 23 and 24 as above described. The screen is omitted but obviously may be connected to the panel 70, as above described, and in some cases the screen may be omitted in practice, permitting the X-ray tube to be tilted adjustably directly by hand. But it should be understood that provision may be made as above described for tilting the X-ray tube by means of its supporting shafts or pivotal devices.

Figure 12:
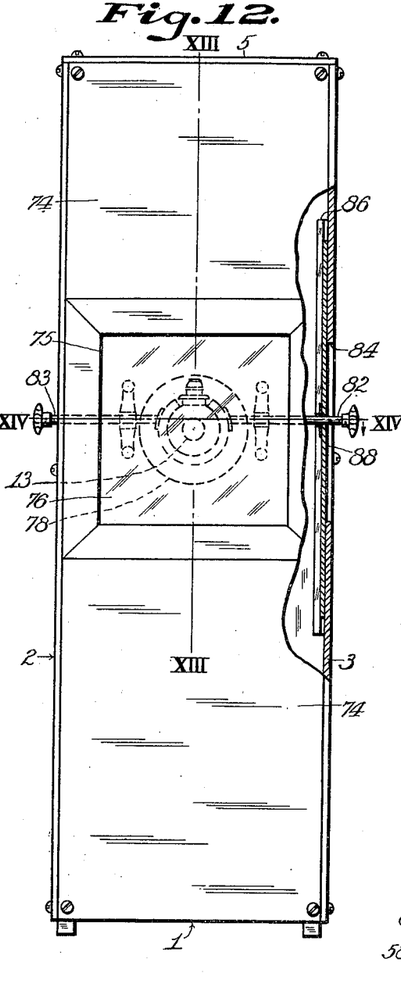
Fig. 12 is a front elevation, partially in section, illustrating another modification of the apparatus.
Figure 13:
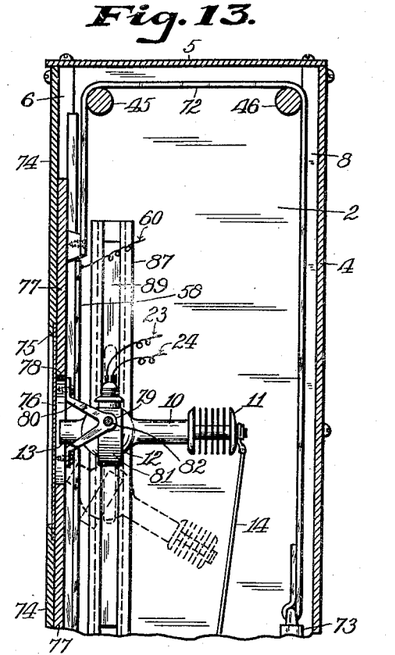
Fig. 13 is a fragmentary sectional elevation approximately on the line XIII—XIII on Fig. 12.
Figure 14:
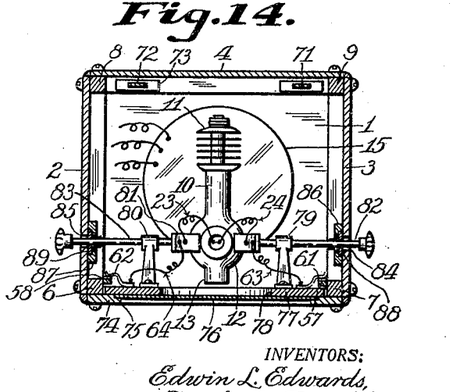
Fig. 14 is a horizontal section approximately on the line XIV—XIV on Fig. 12.

The apparatus shown in Figs. 12, 13 and 14 is mainly constructed as above described but the supporting casing has a single fixed front panel 74 in which is an aperture 75 closed by a suitable screen 76 secured to the panel. A firm panel or slide 77 is arranged behind the panel 74 and preferably has an aperture 78 therein, the slide being suitably guided for vertical adjustment and provided on its inner side with journal bearing brackets 79 and 80. The bulb portion 12 of the X-ray tube is provided with a supporting yoke 81 which has shafts 82 and 83 secured thereto that are rotatably supported in the brackets. so that the neck 13 of the X-ray tube is back of the screen 76. The side panels 3 and 2 have vertical slots 84 and 85 through which the shafts extend, and the panels are provided with guides 86 and 87 at the slots respectively in which slot-closing plates 88 and 89 are guided respectively and connected with the adjacent shafts. The electrical device may be arranged and connected in the casing as above described, and the panel or slide 77 and the X-ray tube is counter-balanced as above described.

Figure 15:
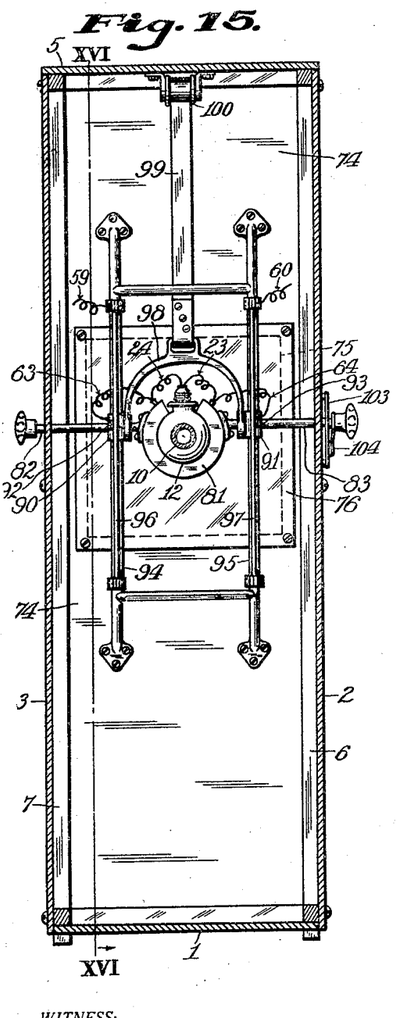
Fig. 15 is a sectional elevation of another modified form of the apparatus, being approximately central of the supporting casing.
Figure 16:
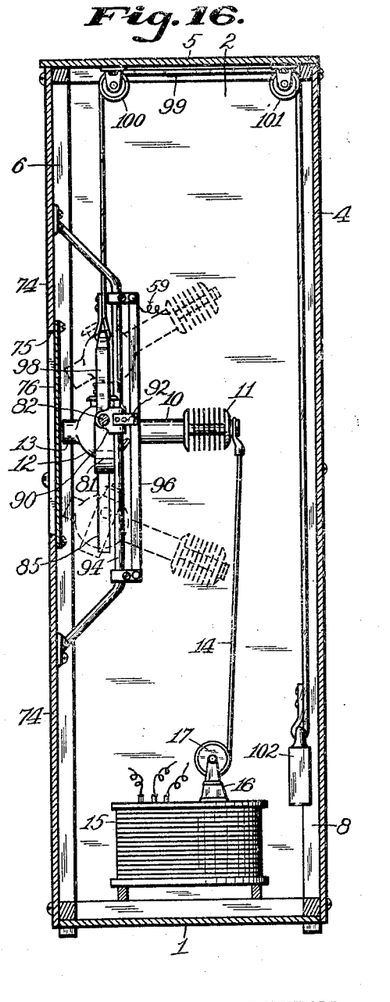
Fig. 16 is a sectional elevation approximately on the line XVI—XVI in Fig. 15.

In the modification shown in Figs. 15 and 16 the casing has the single front panel 74 having the aperture 75 closed by the screen 76. Instead of supporting the X-ray tube on an adjustable front panel the pivotal shafts 82 and 83 are mounted in adjustable journal boxes 90 and 91 respectively which carry electrical brushes 92 and 93 respectively to which the wires 63 and 64 are connected respectively. Two guide bars 94 and 95 are vertically supported on the inner side of the front panel 74 and suitably support two brush-contact bars or rods 96 and 97 respectively so as to be in contact with the brushes, the bars or rods having the wires 59 and 60 connected thereto respectively. A forked hanger 98 rotatively supports the shafts 82 and 83 and is connected to a belt 99 that extends over two pulleys 100 and 101 supported under the top 5 of the casing, the end of the belt having a counter-weight 102 thereon. The side panels of the casing have vertical slots through which the shafts extend. One of the shafts may have a suitable indicator plate 103 hanging thereon adjacent to the outer side of the panel and the adjacent shaft may have an indicator pointer 104 fixed thereto, to indicate the angular tilt of the X-ray tube which in some cases may not be visible to the operator.

Figure 17:
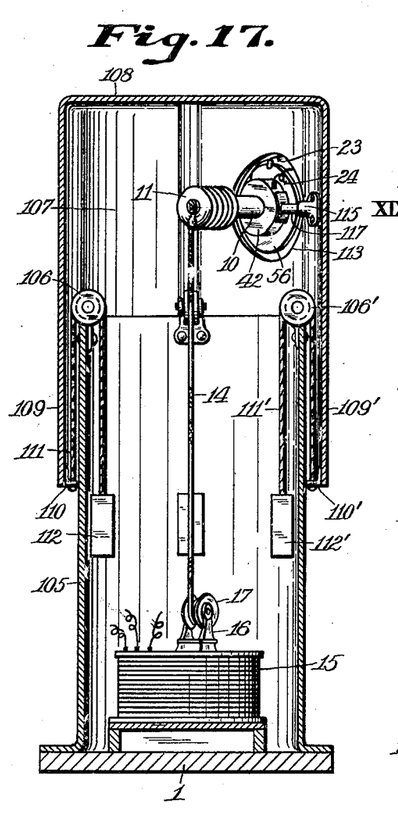
Fig. 17 is a sectional elevation approximately central of still another modified form of the apparatus, more especially with reference to the supporting casing thereof.
Figure 18:
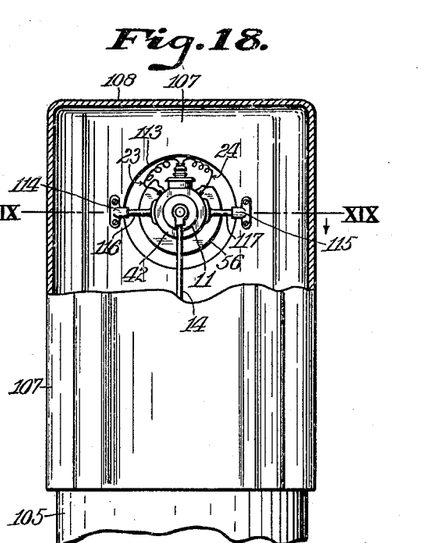
Fig. 18 is a fragmentary sectionad elevation showing a portion of the exterior of the modified casing; and, Fig. 19 is a horizontal section approximately on the line XIX—XIX in Fig. 18.
Figure 19:
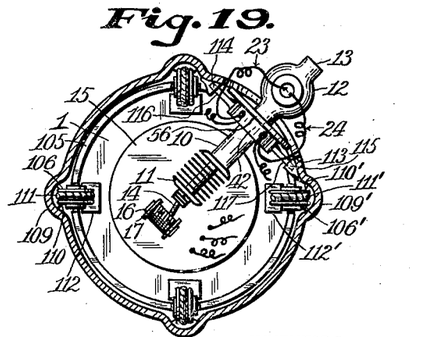

When a cylindrical supporting casing is desired, in order to eliminate angular corners, a hollow cylindrical wall 105 is vertically arranged upon and secured to a suitable bottom 1, and a suitable number of guide sheaves 106, 106' are mounted on the upper portion of the wall. The casing is required to adjustably support the X-ray tube and preferably the entire upper portion of the casing is vertically adjustable, being preferably composed of a cylindrical shell 107 having a top 108, the shell being adapted to slip over and be guided on the wall 105 and having flutes 109, 109' to receive the sheaves. Lugs 110, 110' are secured to the shell in the flutes and cables 111, 111' are secured to the lugs and extend upward in the flutes and over the sheaves, counter-weights 112, 112' being connected to the ends of the cables respectively. The shell 107 has an aperture 113 therein, and journal bearings 114 and 115 are secured to the inner side of the shell adjacent to the aperture and rotatively support pivotal shafts 116 and 117 respectively that are secured to the yoke or collar 42 on the X-ray tube. The transformer 15 is centrally supported on the bottom 1, so that the high-tension circuit 14 extends upward nearly along the vertical axis of the casing to the rear end of the X-ray tube.

In practical use the operator readily raises or lowers the X-ray tube or pivotally tilts it to different angles, as may be desired or required to obtain the best results, the reel 17 always taking up or letting out portions of the high-tension circuit 14 so that it shall not become slack but shall be kept at a safe distance from the casing wall. A well-known attachment may be applied to the neck 13 of the X-ray tube. The dangerously charged portion of the X-ray tube is inaccessible from the outside of the casing and consequently is not a source of danger to a careless operator or to attendants or others, and accidental injury to the X-ray tube is prevented by the use of the screen.

Having thus described the invention, what is claimed as new is—

1. An X-ray apparatus including a supporting casing comprising a front and a back and also sides, a roller arranged immediately adjacent to the upper portion of said front, a roller arranged immediately adjacent to the upper portion of said back, a belt extending over the rollers and also downward immediately adjacent to said front and said back, an X-ray tube having support on the belt adjacent to said front, the support enabling the tube to be tilted, and a counterbalance weight arranged adjacent to said back and connected to said belt.

2. An X-ray apparatus including a closed supporting casing, a high-tension electrical transformer supported centrally in the lower portion of the casing, a reel supported on the top of the transformer, an X-ray tube tiltably supported by the casing above the transformer and the reel and for adjustment relatively to the bottom of the casing, there being a radiator connected with the tube, and a high-tension electrical conductor wound on the reel and extending through clear space within the casing directly to the radiator and the X-ray tube and connected therewith.

3. An X-ray apparatus including a closed supporting casing, a vertically-adjustable guided device in the casing with a counterbalance, a yoke pivotally supported by the guided device, an X-ray tube embraced by and secured to the yoke, there being a radiator on the rearward portion of the tube, the radiator being located above the lower central portion of the casing, a transformer within the lower central portion of the supporting casing, and a high-tension electrical conductor having connection with the transformer and extending upward and to the rearward portion of the X-ray tube and connected with and supported thereby adjacent to said radiator.

4. An X-ray apparatus including a supporting casing comprising a front and sides and also a bottom and a top, the front movably supporting two journal bearings, a yoke having two shafts rotatively supported in said bearings, an X-ray tube secured to the yoke with the rearward end of the tube projecting away from said front beyond the yoke and equi-distant from said sides, rollers supported below said top, a belt extending over the rollers and operatively connected with said bearings, a weight connected to the belt, a transformer supported upon said bottom, and a high-tension electrical conductor having connection with the transformer and extending to the rearward end of the X-ray tube and supported thereby.

5. In an X-ray apparatus, the combination of a supporting casing comprising inclosing wall portions having a front wall comprising a vertically-adjustable panel and two flexible blinds connected to the adjustable panel to be adjusted thereby, and guides for the blinds; and an X-ray tube mounted on the vertically-adjustable panel.

6. In an X-ray apparatus, the combination of a stationary casing part, rollers supported by the stationary casing part, belts extending over the rollers, and weights permanently connected to the belts, with a vertically-movable casing part guided by the stationary casing part and connected with the belts, an X-ray tube pivotally supported on the movable casing part, a transformer arranged below the X-ray tube in the stationary casing part, and a flexible high-tension electrical conductor suspended on the X-ray tube and having connection with the transformer.

7. In an X-ray apparatus, the combination with a supporting casing comprising upright side panels, of an upper front panel portion connected with the upper portions of the side panels, a lower front panel portion connected with the lower portion of the side panels, a vertically-adjustable panel guided adjacent to the said front panel portions, a yoke pivotally supported on the vertically-adjustable panel, an X-ray tube embraced by and secured to the yoke, said tube including a stem having a radiator on its end, and a high-tension electrical conductor connected with and supported by the radiator on the stem of the X-ray tube.

8. In an X-ray apparatus, the combination of a casing part having a relatively adjustable part guided thereby, the adjustable part having an aperture therein, an X-ray tube arranged mainly outside the adjustable part and comprising a housing having a stem extending through and inwardly away from the aperture, there being a radiator on the end of the stem, a yoke secured to said housing and pivotally supported on the inside of said adjustable part adjacent to said aperture, a transformer supported in the casing main part below said radiator, and a flexible high-tension electrical conductor connected with the X-ray tube adjacent to said radiator and having connection with the transformer.

9. In an X-ray apparatus, the combination of a supporting casing comprising two side panels, a back panel, a top, and an adjustable front panel vertically guided adjacent to the side panels and having an aperture therein; a yoke pivotally supported on the inner side of the said front panel, an X-ray tube with a stem extending through said aperture and embraced by and secured to the yoke, said tube having a relatively large bulb on the stem supported beyond the outer side of said front panel, flexible low-tension circuit wires extending out through said aperture to said bulb, two rollers mounted adjacent to said top, a flexible high-tension electrical conductor connected with the inner end of said stem, a belt connected with said front panel and extending over said rollers and nearly to said back panel, and a weight connected to said belt adjacent to said back panel.

10. In an X-ray apparatus, the combination of a supporting casing comprising a bottom, two side panels, a back panel, a top, two low rollers mounted adjacent to the forward and rearward ends respectively of said bottom, two high rollers mounted adjacent to the forward and rearward portions respectively of said top, an adjustable front panel vertically guided adjacent to said side panels, a flexible blind connected to the upper portion of the adjustable panel and extending over said high rollers, a counterweight connected to said blind, and a flexible blind connected to the lower portion of the adjustable panel and extending under said low rollers towards said back panels and connected to said counter-weight; and an X-ray tube mounted on the adjustable front panel.

11. In an X-ray apparatus, the combination with an X-ray tube of the type comprising a bulb having a short front neck on one side and a relatively long stem on the opposite side thereof, and a radiator on the end of the stem; of an upright casing tiltingly supporting the X-ray tube with the radiator approximately on the vertical axis of the casing and permitting upward or downward movement of the radiator, a transformer arranged in the casing below said radiator, a take-up reel arranged upon the top of the transformer, a flexible high-tension electrical conductor extending from the reel upward to the radiator and connected therewith, the conductor being bodily supported and drawn upward by the radiator, and flexible low-tension electrical circuit wires connected with the bulb of the X-ray tube and having support within the casing.

12. In an X-ray apparatus, the combination with a supporting and inclosing casing having an aperture in one portion thereof, and a transformer in the lower portion of the casing, of a yoke pivotally and adjustably supported on the inside of the casing, an X-ray tube extending through said aperture and said yoke and being secured to the yoke, the X-ray tube being of the type comprising a bulb having a short front neck on one side and a relatively long stem on the opposite side thereof and a radiator on the end of the stem, said bulb and front neck being arranged outside the casing and said stem arranged inside the casing, a flexible high-tension electrical conductor connected with the X-ray tube and extending from the end of said stem to the transformer, a counterbalance for the X-ray tube, and flexible low-tension circuit wires having support within the casing and extending into said bulb to the X-ray tube.

In testimony whereof, we affix our signatures in presence of two witnesses.

EDWIN L. EDWARDS.
FRANK A. FARWELL.

Witnesses:
E. T. SILVIUS,
H. L. ARCHER.